Feb. 22, 1944. J. J. HARTZ 2,342,580
PUNCTURE SEAL TUBE
Filed Feb. 16, 1939

Inventor
John J. Hartz
By
Attorney

Patented Feb. 22, 1944

2,342,580

UNITED STATES PATENT OFFICE 2,342,580

PUNCTURE SEAL TUBE

John J. Hartz, Cuyahoga Falls, Ohio, assignor to Wingfoot Corporation, Akron, Ohio, a corporation of Delaware Application February 16, 1939, Serial No. 256,712

6 Claims. (Cl. 154—15)

This invention relates to an improved pneumatic tube of the type providing a layer of plastic material capable of sealing holes caused by bullets, nails and the like and to a method of making the improved tube.

Puncture sealing pneumatic tubes are well known and usually consist of an outer wall of cured rubber and an inner layer of uncured rubber or other tacky material which has little or no strength but is capable of flow so as to immediately seal a hole in the tube caused by the passage of a bullet, nail, thorn or similar object. Such tubes are useful where it is necessary that the tube continue to function without immediate repairs, as in airplane landing gear.

The tacky sealing compound, by its very nature, tends to adhere to any surface it touches and, particularly, the opposite internal surfaces of the tube will adhere together when the tube is in collapsed condition and will not, therefore, readily separate when the tube is inflated. The present invention overcomes this difficulty in an improved manner by providing a non-tacky surface for the tacky puncture sealing compound. This surface does not in any way interfere with the sealing function of the compound since the tacky material remains plastic beneath the non-tacky surface. Furthermore, it is substantially integral with the tacky material to which it is applied and may be somewhat elastic so as to expand and contract when the tube is inflated or deflated.

The invention is more particularly described in connection with the accompanying drawing in which.

Figures 1, 2:
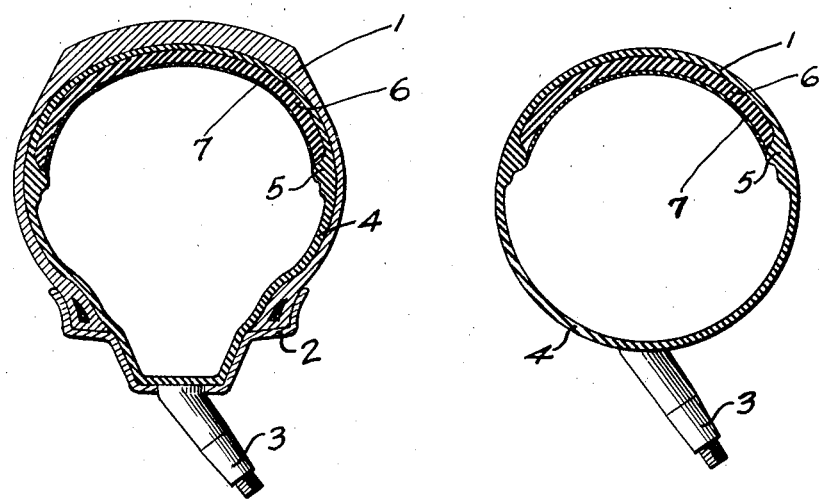
Fig. 1 is a section through the improved puncture seal tube in place on a rim.
Fig. 2 is a similar section through the tube when off the rim.

Referring to the drawing, the tube 1 is mounted on a conventional rim 2 and can be inflated through the valve 3. The wall 4 of the tube is made of vulcanized rubber provided on its inner surface with a ridge 5 which serves to maintain a layer 6 of uncured rubber or similar tacky material on that portion of the tube remote from the rim, this portion of the tube being that which is most likely to be punctured, as will be apparent. The tacky compound is somewhat flowable and the ridge or shoulder 5 helps to maintain the compound in place where it is needed.

Figure 3:
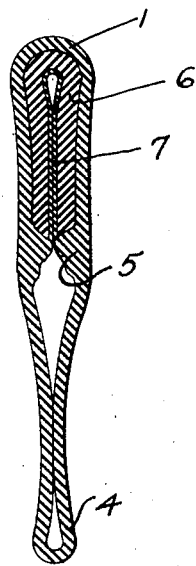
Fig. 3 is a section through the tube in the collapsed condition.

This compound is effective in sealing any punctures in the tube since it promptly flows together to close the resulting hole when the nail or bullet or the like passes through or is withdrawn. Nevertheless, the tube is not entirely satisfactory due to the fact that the tacky surfaces adhere together when the tube is collapsed, as shown in Fig. 3, in packing or storage or under other circumstances. In such case, the two faces adhere so tenaciously together that the tube is inflatable with difficulty or not at all. Various means have been proposed for the purpose of overcoming this defect but none of these is completely satisfactory.

It has now been found that the inner surfaces of the tacky layer may be coated with a substance which imparts a dry, non-tacky surface 7 or the tacky compound may be treated to produce such a surface thereon. This may be done in various ways and it is not intended to limit the invention to any one of the methods described below, the same being by way of illustration and not of limitation. Thus, the tacky layer may be coated with a suspension of prevulcanized rubber, such as "Vultex," a product of the Vultex Chemical Company, Cambridge, Mass. The entire tube is then placed in the vulcanizer with the result that the tube proper is cured, the tacky layer remaining uncured and soft due to the fact that it is practically unvulcanizable or only slowly vulcanizable, and the coating of prevulcanized rubber is dried to afford a non-tacky surface for the puncture-sealing compound.

Or the non-tacky layer may also be applied by painting with a pre-compounded latex which is not previously cured, this method being advantageous where greater stretch occurs during preforming of the tube before vulcanizing. It has also been of value to use a coat of one type of suspension on top of a coat of the other type, or, mixtures of the two types may be employed, depending upon the degree of dispersion that occurs after the coat or coats are applied.

The non-tacky layer may also be applied by painting the tacky material with rubber latex containing vulcanizing ingredients, including sulfur and an accelerator. However, where the non-tacky coating is to be vulcanized during the curing of the tube, it is necessary that the accelerator used be very quick-acting, one of the so-called ultra accelerators being suitable. This is for the reason that the vulcanizing ingredients in the suspension should not have time to penetrate into the tacky layer during vulcanization and thus somewhat harden the same with consequent reduction in its heat sealing properties. Zinc mercaptobenzothiazole is one ultra accelerator which has been found to be suitable for the present purpose. Others are well known and may be used, such as zinc dimethyl dithiocarbamate, zinc dibutyl dithiocarbamate, tetramethyl thiuram mono sulfide and tetramethyl thiuram disulfide.

Furthermore, it is desirable to employ a rubber non-solvent such as water or alcohol, as the vehicle in which the non-tacky layer is applied, since rubber solvents, when applied to the surface of the puncture-sealing layer, tend to soak into the material and cause it to be spongy after cure.

It is not intended to limit the invention to suspensions of rubber but there may also be used synthetic rubber, certain resins such as "Pliolite," a resinous rubber derivative, rubber compounds such as rubber hydrochloride and, in fact, any material which provides the tacky puncture sealing compound with a non-tacky surface, provided the method of hardening the surface does not affect the puncture sealing properties of the underlying sealing compound.

A typical composition for carrying out the invention is the following:

| | Parts |
|---|---|
| Rubber in latex form | 100.0 |
| ZnO | 2.0 |
| Sulfur | 1.0 |
| Zinc mercaptobenzothiazole | 0.5 |

This compound was brushed on the inner surface of the tacky compound and was allowed to dry for about 1½ hours. Thereafter, the tube was subjected to vulcanizing conditions. The cured tube showed no tendency to stick together during transit and storage and the tackless inner coating or lining also served the purpose of retaining the rather plastic sealing medium in position, cooperating in this respect with the ridges 5 shown in the drawing.

Latex may be compounded in other proportions than those given and, as mentioned, the rubber may be applied in the form of a prevulcanized suspension. Likewise, rubber resins or rubber-containing chemical compounds may be used to impart a non-tacky surface to the sealing layer. Thus, while one preferred form of the invention has been described herein, it will be apparent to those skilled in the art that various modifications may be made without departing from the spirit of the invention or the scope of the appended claims in which it is intended to cover all features of patentable novelty residing in such invention.

What I claim is:

1. A method of applying a non-tacky surface to the tacky layer of a puncture-sealing pneumatic tube which comprises coating the tacky layer with a suspension of rubber in a non-solvent for rubber and vulcanizing the same while preventing vulcanization of the tacky layer.

2. A method of applying a non-tacky surface to the tacky layer of a puncture-sealing pneumatic tube which comprises coating the tacky layer with a suspension of rubber from the group consisting of prevulcanized rubber and unvulcanized, pre-compounded vulcanizable rubber in a non-solvent for rubber and drying the same.

3. A method of making a puncture-sealing pneumatic tube in which the puncture-sealing compound has a non-tacky surface which comprises applying a layer of puncture-sealing rubber to the inner surface of a vulcanizable tube, coating the exposed surface of said puncture-sealing rubber with a suspension of a prevulcanized rubber in a non-solvent for rubber and then subjecting the tube to vulcanizing conditions.

4. A method of making a puncture-sealing pneumatic tube in which the puncture-sealing compound has a non-tacky surface which comprises applying a layer of puncture-sealing rubber to the inner surface of a vulcanizable tube, coating the exposed surface of said puncture-sealing rubber with a suspension of unvulcanized precompounded rubber in a non-solvent for rubber and then subjecting the tube to vulcanizing conditions.

5. A method of making a puncture-sealing pneumatic tube in which the puncture-sealing layer has a non-tacky surface which comprises applying a layer of puncture-sealing rubber to the inner surface of a vulcanizable tube, coating the exposed surface of said puncture-sealing rubber with a suspension of rubber and a quick-acting accelerator in a non-solvent for rubber and then subjecting the tube to vulcanizing conditions.

6. A method of making a puncture-sealing pneumatic tube in which the puncture-sealing layer has a non-tacky surface which comprises applying a layer of puncture-sealing rubber to the inner surface of a vulcanizable tube, coating the exposed surface of said puncture-sealing rubber with rubber latex containing a quick-acting accelerator and then subjecting the tube to vulcanizing conditions.

JOHN J. HARTZ.